No. 12,532. REISSUED SEPT. 18, 1906.

J. B. BLAW.

MOLD FOR SEWERS, &c.

APPLICATION FILED JUNE 30, 1906.

2 SHEETS—SHEET 1.

WITNESSES

Theodore Thomas

J. C. Bradley

INVENTOR

Jacob B. Blaw by atty

Paul Synnestvedt

No. 12,532. REISSUED SEPT. 18, 1906.

J. B. BLAW.

MOLD FOR SEWERS, &c.

APPLICATION FILED JUNE 30, 1906.

2 SHEETS—SHEET 2.

Fig. 3½

WITNESSES

Theodore Thomas.

J. C. Bradley

INVENTOR

Jacob B. Blaw by atty

Paul Synnestvedt

UNITED STATES PATENT OFFICE.

JACOB B. BLAW, OF PITTSBURG, PENNSYLVANIA, ASSIGNOR TO BLAW COLLAPSIBLE STEEL CENTERING COMPANY, OF PITTSBURG, PENNSYLVANIA, A CORPORATION OF NEW JERSEY.

MOLD FOR SEWERS, &c.

No. 12,532. Specification of Reissued Letters Patent. Reissued Sept. 18, 1906.

Original No. 768,025, dated August 23, 1904. Application for reissue filed June 30, 1906. Serial No. 324,280.

*To all whom it may concern:*

Be it known that I, JACOB B. BLAW, a citizen of the United States, residing at Pittsburg, county of Allegheny, State of Pennsylvania, have invented certain new and useful Improvements in Molds for Sewers, &c., of which the following is a specification.

My invention relates to an improvement in a mold for forming a sewer, as shown in the Letters Patent granted to me the 5th day of May, 1903; and it consists of means for vertically sustaining the sections of the body of the mold and distending the same in vertical direction and around the circumference between the top and bottom, so as to avoid contraction of what may be termed the "sides" of the mold while being vertically expanded and to more uniformly expand the mold, said means being adapted to be most conveniently applied to said sections, and removed therefrom in dismembering the mold.

It further consists of novel means for distending and contracting the mold in lateral direction, all as will be hereinafter described, the novel feature being pointed out in the claims.

Figure 1:
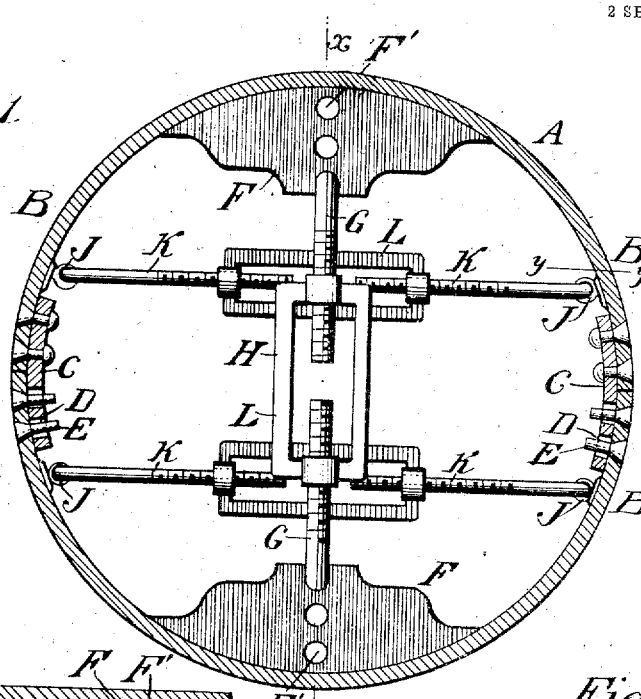
Figure 3:
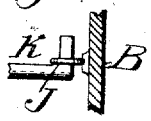
Figure 2:
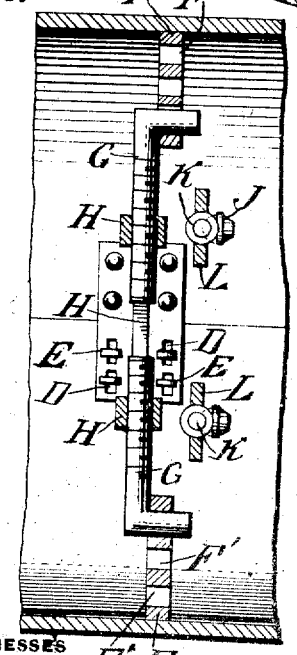
Figure 4:
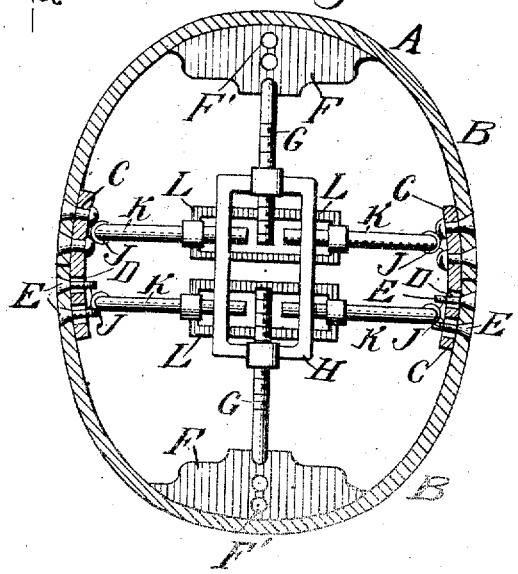
Figure 5:
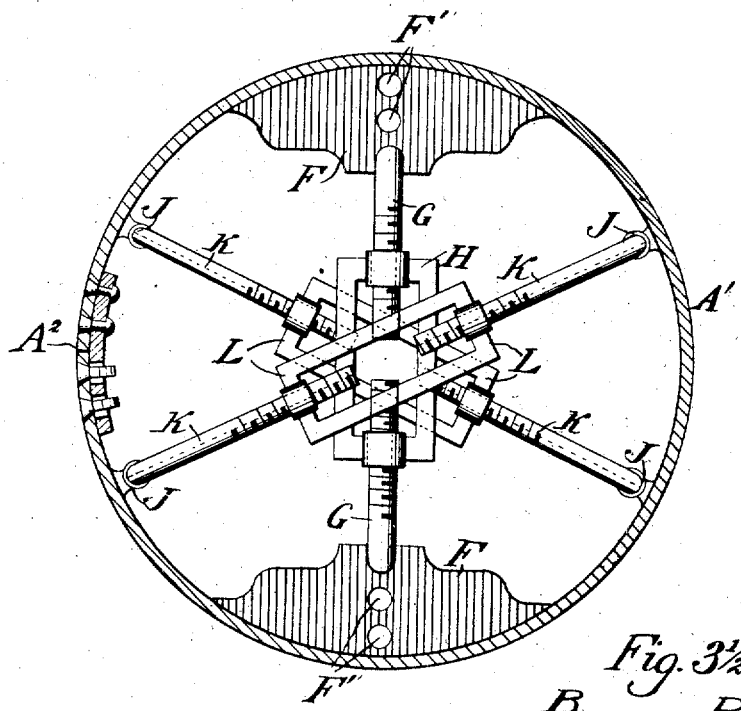
Figure 5:
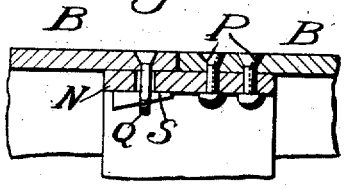
Figure 6:
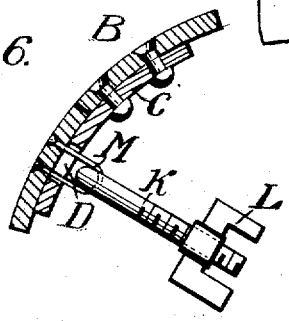

Figure 1 represents a transverse vertical section of a sewer-mold embodying my invention. Figure 2 represents a longitudinal vertical section thereof on line *x x*, Fig. 1. Fig. 3 represents a section of a portion on line *y y*, Fig. 1. Fig. 3½ represents a horizontal section of portions of contiguous bodies. Fig. 4 represents a transverse vertical section of a modification. Fig. 5 represents a transverse vertical section of another modification. Fig. 6 represents a section of a modification.

Similar letters of reference indicate corresponding parts in the figures.

Referring to the drawings, A designates a mold having a tubular body formed of upper and lower sections B B and adapted to serve as a core for the building of a sewer of cement, brick, or other material built.

C designates cleats or plates, which are riveted or otherwise connected with the ends of one section on the interior thereof and overlap the adjacent ends of the other sections, the overlapping portions having slots D, through which are passed the bolts E, which are rotatably connected with the adjacent portion of the lower section B and have flattened heads which may pass through said slots and then by a quarter-turn of the bolts occupy positions at a right angle to said slots thus connecting the sections as one.

F designates shoes, which are of segmental form and rest, respectively, upon the inner faces of the top and bottom of the opposite sections of the mold, the same having connected with them the hooks G, the shanks of which are screw-threaded for the engagement of threaded portions of buckles H, it being noticed that said shoes are each provided with a series of openings F′, arranged one under the other, and that the end limbs of said hooks may be placed in the respective openings F′ of said shoes relatively to the diametrical distance between the shoes and the requirements of adjustably connecting the hooks with said shoes, it being evident that by rotating said buckles the hooks, and consequently the shoes, are advanced and forced outwardly in vertical direction, and the body of the mold is accordingly expanded, strained, and braced, whereby it may sustain the weight of earth, &c., subsequently superimposed on the same. When said buckles are rotated in the opposite direction, the hooks are drawn in and the shoes are relieved of pressure, and thus the top and bottom of the body are permitted to contract or close, and thus reduce the vertical diameter of said body.

On the inner faces of the sections are the eyes J, to which are applied the hooks K, the shanks of the latter extending at a right angle to those of the hooks G and being screw-threaded and engaged by buckles L, so that the side portions of the sections of the body may be expanded and contracted in lateral directions, and thereby strained, stiffened, and braced. It will be noticed that the eyes J are so disposed in the side portion of the body that the hooks K occupy different planes from those of the hooks of the shoes F. Consequently the buckles H and L may be rotated without interfering with each other, as will be seen in Fig. 2.

The operation is as follows: The lower section of the mold is placed in a trench, on which is previously laid the cement or other material for the lower portion of the sewer.

The upper section is then located on the lower one and secured by the bolts E. The shoes, hooks, and buckles are then applied and the latter operated, thus subjecting the sections to outward pressure and strain from within in vertical and circumferential directions alike at the top and bottom and at intervals intermediate of the same, causing uniformity in the expansion of the mold and bracing the same around the mold, thereby presenting a strong structure on which the remaining cement or material is laid, thus molding the sewer in an effective, practical, and convenient manner. Another length of the mold is then placed against the end of the previous one and coupled thereto, and the molding is continued. (See Fig. 3½.) When the cement or material is set the upper and lower mold sections B are disconnected by turning the bolts E so that the heads thereof are longitudinal of the slots in the plates C, after which the upper buckle L is operated, thereby pulling in the edges of the upper section B, and gradually freeing such member from the cement. The lower buckle L is then operated until the edges of the lower member B are similarly freed from the cement, although these edges are not pulled in the same distance as the edges of the upper member. The buckles H are then operated, thereby causing the members B to approach each other and free the remaining limited mold-surface opposite the ends of the vertical turnbuckle from the cement. The edges of the upper and lower members B being out of alinement such edges do not interfere upon the operation of the buckles H. It will be apparent from the foregoing description that by securing the member K near the edges of the mold members B very little force is necessary to start the release of such edges as the flexibility of the members B allows the freeing of the small amount of surface at a time and a sort of peeling action occurs gradually freeing the mold members from the edges toward the center, whereby a minimum amount of force is necessary and no jarring or hammering need be employed to loosen the mold.

In Figs. 1 and 2 the body of the mold is shown as cylindrical in cross-section, while in Fig. 4 it is shown elliptical or ovoid. In said Fig. 4 the eyes J are shown as connected with the plates C instead of directly with the sections, as in Figs. 1 and 2.

In Fig. 5 the body A′ of the mold is shown as formed of a single piece of material bent into cylindrical or other shape, its ends meeting at $A^2$, thus permitting the body to expand when subjected to the action of the shoes F, hooks G, buckles H, hooks K, and buckles L, it being noticed that the hooks K and buckles L cross each other, and said hooks K, are connected with eyes J on the inner side of the body A′, it being evident that by properly rotating the several buckles the body previously expanded may be contracted.

In Fig. 6 I show a staple or looped-shaped piece M, which is connected with the body B adjacent to the cleat or plate C, the latter being provided with a slot D, through which said piece passes into the interior of said body, said piece forming a connection for one of the hooks K, whereby the body may be expanded and contracted, as in the previous constructions. When the mold is to be dismembered, the hook is disconnected from the piece M, and the cleat C may be removed from said piece.

In Fig. 3½ I show a coupling for adjacent or contiguous mold-bodies when laid end to end, the same consisting of the annular cleat N, one end of which is firmly secured to one of the bodies by rivets P or other suitable means, said cleat overlapping the joint with the adjacent body, to which latter is secured the staple Q, which projects inwardly therefrom and passes through a slot R in said cleat. A wedge or key S is passed through the inner portion of said staple and, riding against the inner face of the cleat, draws the staple tightly in position, and thus firmly connects or couples the adjacent bodies. A number of staples, slots, and wedges may be employed around the cleat, as desired, the same providing a convenient or easily-applied and effective coupling or fastening, the wedges being readily loosened and removed when the bodies are to be separated.

It is evident that the invention is equally applicable to the formation of water-pipes, conveyers, conduits, and other tubular structures of the kind.

In the practical use of the mold or core shown in my former patent, No. 727,272, dated May 5, 1903, it is found in removing the expanding device difficulty arises from the fact that the threaded rods are in that device secured to the shoe, so that it is either necessary to remove the entire expanding device as a unit or else to detach it from the shell and then turn the buckle, so as to remove it from the rods G. It is evident that in my present device a very slight turn of the buckle H permits a detachment of the rod and buckle from both shoes, the three parts being then separately removable.

Various changes may be made in the details of construction without departing from the general spirit of my invention, and I do not, therefore, desire to be limited in each case to the same.

Having thus described my invention, what I claim as new, and desire to secure by Letters Patent, is—

1. A mold composed of a divided tubular body, a cleat connected with one end of said body and freely overlapping the other end of said body, means for detachably securing the free end of said cleat with the adjacent end of the body and shoes within the body at the top and bottom thereof each of said shoes having an opening therein, in combination with hooks adapted to be detachably connected with said shoes in the respective opening therein, and are provided with threaded shanks and threaded buckles fitted on said shanks.

2. A mold composed of a divided tubular body, means for detachably securing together the divided ends of said body, and shoes within the body at the top and bottom thereof, in combination with hooks detachably connected with said shoes and provided with threaded shanks, buckles fitted on said shanks and auxiliary threaded hooks and buckles crossing the first-named hooks and buckles, and means for connecting the said auxiliary hooks with the sectional mold around the latter intermediate of said shoes.

3. A mold composed of a divided tubular body, means for detachably securing together the divided ends thereof and shoes within the body at the top and bottom thereof, in combination with hooks which are adapted to be detachably connected with said shoes and are provided with threaded shanks and vertical buckles fitted on said shanks, eyes on the sides of said body and transversely-extending hooks which detachably engage said eyes and have threaded shanks and buckles engaging the latter, the hooks of the side eyes crossing those of the shoes, and said side eyes being located around the periphery of the mold intermediate of said shoes.

4. In a mold, a coupling for adjacent tubular bodies located end to end consisting of a cleat secured to an end of one of said bodies and overlapping the end of the adjacent body, a staple or eye on the latter-named end passing freely through said cleat into the mold, and a wedge passing through said staple on the inner side of said cleat.

5. A divided tubular sewer mold member consisting of independent flexible parti-tubular sections, and means engaging the edges of each section whereby such edges may be sprung inward and the sections gradually loosened from the molded material.

6. A divided tubular sewer mold member consisting of two independent opposing flexible parti-tubular sections, and rigid adjustable means extending transversely of the mold and engaging the edges of each section whereby such edges may be moved in and out.

7. A sewer mold consisting of two independent substantially semi-tubular sections of flexible material and adjustable screw-threaded struts connecting the opposite edges of each section whereby such edges may be moved in and out.

8. A sewer mold comprising a pair of expansible members of flexible metal and a cleat on the interior of the mold adapted to overlap and stiffen the meeting edges and detachably secured to one member.

In testimony whereof I have hereunto signed my name in the presence of the two subscribed witnesses.

JACOB B. BLAW.

Witnesses:
J. C. BRADLEY,
ARCHWORTH MARTIN.